US012611634B2

(12) United States Patent
Shimizu et al.

(10) Patent No.: US 12,611,634 B2
(45) Date of Patent: Apr. 28, 2026

(54) SEPARATION MEMBRANE COMPLEX, METHOD OF PRODUCING SEPARATION MEMBRANE COMPLEX, AND SEPARATION METHOD

(71) Applicant: NGK Insulators, Ltd., Nagoya City (JP)

(72) Inventors: Katsuya Shimizu, Kasugai City (JP); Koh Kobayashi, Nagoya City (JP); Kenichi Noda, Nagoya City (JP); Makiko Ichikawa, Nagoya City (JP); Naoto Kinoshita, Nagoya City (JP)

(73) Assignee: NGK INSULATORS, LTD., Nagoya (JP)

( * ) Notice: Subject to any disclaimer, the term of this patent is extended or adjusted under 35 U.S.C. 154(b) by 712 days.

(21) Appl. No.: 18/052,973

(22) Filed: Nov. 7, 2022

(65) Prior Publication Data

US 2023/0084665 A1      Mar. 16, 2023

Related U.S. Application Data

(63) Continuation of application No. PCT/JP2021/006394, filed on Feb. 19, 2021.

(30) Foreign Application Priority Data

May 25, 2020     (JP) ................................ 2020-090315

(51) Int. Cl.
    *B01D 53/22*     (2006.01)
    *B01D 67/00*     (2006.01)
    (Continued)

(52) U.S. Cl.
    CPC ....... *B01D 71/0281* (2022.08); *B01D 53/228* (2013.01); *B01D 67/0051* (2013.01);
    (Continued)

(58) Field of Classification Search
    CPC .............. B01D 71/0281; B01D 69/106; B01D 71/0215; B01D 69/1213; B01D 69/108;
    (Continued)

(56) References Cited

U.S. PATENT DOCUMENTS

2003/0024881 A1*   2/2003   Kalthod ............... B01D 53/228
                                           210/488
2007/0009776 A1*   1/2007   Nodono .............. H01M 8/1093
                                           429/535

(Continued)

FOREIGN PATENT DOCUMENTS

CN         109499273 A     3/2019
JP        2010-158665 A     7/2010
    (Continued)

OTHER PUBLICATIONS

English translation of the International Preliminary Report on Patentability (Chapter I) dated Dec. 8, 2022 (Application No. PCT/JP2021/006394).

(Continued)

*Primary Examiner* — Anthony Shumate
(74) *Attorney, Agent, or Firm* — BURR PATENT LAW, PLLC

(57) ABSTRACT

A separation membrane complex includes a porous support and a separation membrane formed on the support. The separation membrane has a small void. A small void index $I_k$ expressed by $(\Sigma(S_k^{1.5}))/(S_m^{1.5})$ and indicating the abundance ratio of small voids is higher than or equal to $10 \times 10^{-15}$, and a large void index $I_p$ expressed by $(\Sigma(S_p^2))/(S_m^2)$ and indicating the abundance ratio of large voids is lower than $200 \times 10^{-22}$, where $S_m$ is the surface area of the separation membrane, $S_k$ is the area per small void, and $S_p$ is the area per large void. Accordingly, the separation membrane complex can achieve a high separation ratio.

9 Claims, 4 Drawing Sheets

(51) Int. Cl.
  B01D 69/10    (2006.01)
  B01D 69/12    (2006.01)
  B01D 71/02    (2006.01)

(52) U.S. Cl.
  CPC ......... B01D 69/105 (2013.01); B01D 69/106
    (2022.08); B01D 69/108 (2022.08); B01D
    69/1213 (2022.08); B01D 71/0215 (2022.08)

(58) Field of Classification Search
  CPC . B01D 53/228; B01D 67/0051; B01D 69/105
  See application file for complete search history.

(56)       References Cited

U.S. PATENT DOCUMENTS

| | | | | |
|---|---|---|---|---|
| 2008/0134895 | A1* | 6/2008 | Ruud | B01D 71/024 |
| | | | | 96/9 |
| 2008/0241383 | A1* | 10/2008 | Yoshino | B01D 67/0072 |
| | | | | 427/255.28 |
| 2010/0144512 | A1 | 6/2010 | Uchikawa et al. | |
| 2012/0272826 | A1 | 11/2012 | Uchikawa et al. | |
| 2015/0336058 | A1* | 11/2015 | Hillmyer | B01D 67/0031 |
| | | | | 210/500.34 |
| 2016/0008771 | A1 | 1/2016 | Yajima et al. | |
| 2017/0189862 | A1 | 7/2017 | Imasaka et al. | |
| 2017/0259214 | A1* | 9/2017 | Onozuka | C01B 39/38 |
| 2018/0043346 | A1* | 2/2018 | Bahar | C08J 5/2262 |
| 2020/0023319 | A1* | 1/2020 | Hagio | C01B 39/54 |
| 2021/0016233 | A1* | 1/2021 | Noda | B01D 65/003 |
| 2021/0370243 | A1* | 12/2021 | Yoshimura | C01B 39/48 |
| 2023/0277989 | A1* | 9/2023 | Noda | B01J 20/3204 |
| | | | | 210/500.25 |
| 2024/0100474 | A1* | 3/2024 | Kobayashi | B01D 69/043 |
| 2024/0351876 | A1* | 10/2024 | Choi | B01D 67/0051 |

FOREIGN PATENT DOCUMENTS

| | | |
|---|---|---|
| JP | 2019-181456 A | 10/2019 |
| WO | 2011/105511 A1 | 9/2011 |
| WO | 2014/157701 A1 | 10/2014 |
| WO | 2016/006564 A1 | 1/2016 |

OTHER PUBLICATIONS

International Search Report and Written Opinion (Application No. PCT/JP2021/006394) dated Apr. 13, 2021 (with English translation).

German Office Action (Application No. 11 2021 001 759.4) dated Oct. 31, 2025 (with English translation) (11 pages).

XU Jiachen et al., "Reprocessing and Performance Evaluation of a-Al2O3 Carrier Tube of Disabled A-type Zeolite Membrane Tube," *Journal of the Chinese Ceramic Society*, vol. 46, No. 4, Apr. 2018, pp. 556-563. (8 pages).

Chinese Office Action (Application No. 202180036955.0) dated Nov. 28, 2025 (with English translation) (14 pages).

* cited by examiner

SEPARATION MEMBRANE COMPLEX, METHOD OF PRODUCING SEPARATION MEMBRANE COMPLEX, AND SEPARATION METHOD

CROSS-REFERENCE TO RELATED APPLICATIONS

The present application is a continuation application of International Application No. PCT/JP2021/006394 filed on Feb. 19, 2021, which claims the benefit of priority to Japanese Patent Application No. 2020-090315 filed on May 25, 2020. The entire contents of these applications are incorporated herein by reference.

TECHNICAL FIELD

The present invention relates to a separation membrane complex, a method of producing a separation membrane complex, and a separation method using the separation membrane complex.

BACKGROUND ART

Various studies and developments are currently underway to obtain a zeolite membrane complex by forming a zeolite membrane on a porous support and to use the molecular-sieving function of the zeolite in applications such as separation of specific molecules or adsorption of molecules.

For example, separation processing is known in which a mixed gas (e.g., a mixed gas of $CO_2$ and $CH_4$) is supplied to a zeolite membrane complex in order to cause a high-permeability substance (e.g., $CO_2$) to pass through the zeolite membrane complex and to be separated from the mixed gas. At this time, a low-permeability substance (e.g., $CH_4$) may leak together with the high-permeability substance through defects in the zeolite membrane, and this may cause a decrease in separation ratio (i.e., a value obtained by dividing the permeance to the high-permeability substance by the permeance to the low-permeability substance). In view of this, International Publications No. 2014/157701 (Document 1) and No. 2011/105511 (Document 2) propose methods of producing a zeolite membrane with a small number of defects.

Although simply reducing the number of defects in the zeolite membrane may achieve a high separation ratio during separation of a mixed gas under low differential pressure conditions having a small difference between supply-side pressure and permeation-side pressure, in this case it may be difficult to suppress a decrease in separation ratio under high differential pressure conditions having a great difference between the supply-side pressure and the permeation-side pressure. Besides, if the separation ratio is tried to increase by reducing the number of defects in the zeolite membrane, there is no alternative but to increase the thickness of the zeolite membrane and this may cause a decrease in the permeance of the zeolite membrane to the high-permeability substance.

SUMMARY OF THE INVENTION

The present invention is intended for a separation membrane complex, and it is an object of the present invention to achieve a high separation ratio not only under low differential pressure conditions but also under high differential pressure conditions.

A separation membrane complex according to one preferable embodiment of the present invention includes a porous support, and a separation membrane formed on the support. The separation membrane has a small void. A small void index $I_k$ expressed by $(\Sigma(S_k^{1.5}))/(S_m^{1.5})$ and indicating an abundance ratio of small voids is higher than or equal to $10 \times 10^{-15}$, and a large void index $I_p$ expressed by $$(\sum(S_p^2))/(S_m^2)$$

and indicating an abundance ratio of large voids is lower than $200 \times 10^{-22}$, where $S_m$ is a surface area of the separation membrane, $S_k$ is an area per small void, and $S_p$ is an area per large void.

This achieves a high separation ratio.

Preferably, the large void index $I_p$ is lower than $100 \times 10^{-22}$.

Preferably, the small void index $I_k$ is higher than or equal to $20 \times 10^{-15}$.

Preferably, when a 25-degree Celsius mixed gas that contains 50% by volume of $CO_2$ and 50% by volume of $CH_4$ is supplied, $CH_4$ permeance in a case where supply-side pressure is 8.0 MPaG and permeation-side pressure is 0.0 MPaG is lower than 1.9 times of the $CH_4$ permeance in a case where the supply-side pressure is 0.3 MPaG and the permeation-side pressure is 0.0 MPaG.

Preferably, the separation membrane is a zeolite membrane.

Preferably, the zeolite membrane is composed of a maximum 8- or less-membered ring zeolite.

The present invention is also intended for a method of producing a separation membrane complex. A method of producing a separation membrane complex according to one preferable embodiment of the present invention includes a) preparing a porous support formed by firing, b) heating the support at a pretreatment temperature, c) after the operation b), washing the support with a fluid, d) after the operation c), depositing a seed crystal on the support, and e) forming a separation membrane on the support by immersing the support with the seed crystal deposited thereon in a starting material solution and growing a zeolite from the seed crystal by hydrothermal synthesis. The pretreatment temperature is higher than or equal to 400° C. and lower than 80 percent of a firing temperature at which the support is fired in the operation a). This achieves a high separation ratio.

The present invention is also intended for a separation method. A separation method according to one preferable embodiment of the present invention includes a) preparing the separation membrane complex described above, and b) supplying a mixture of substances that contains a plurality of types of gas or liquid to the separation membrane complex and allowing a substance with high permeability among the mixture of substances to pass through the separation membrane complex and to be separated from the other substances. This achieves a high separation ratio.

Preferably, the mixture of substances includes one or more types of substances selected from among hydrogen, helium, nitrogen, oxygen, water, water vapor, carbon monoxide, carbon dioxide, nitrogen oxides, ammonia, sulfur oxides, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

These and other objects, features, aspects and advantages of the present invention will become more apparent from the following detailed description of the present invention when taken in conjunction with the accompanying drawings.

DETAILED DESCRIPTION

Figure 1:
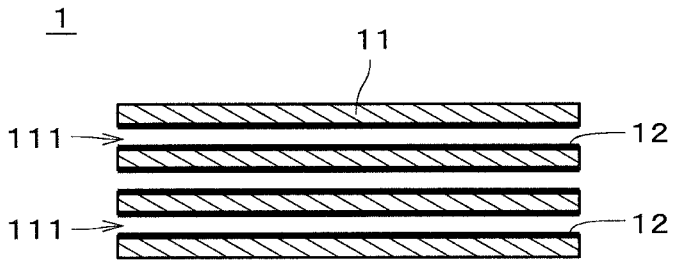
FIG. 1 is a sectional view of a separation membrane complex according to one embodiment.
Figure 2:
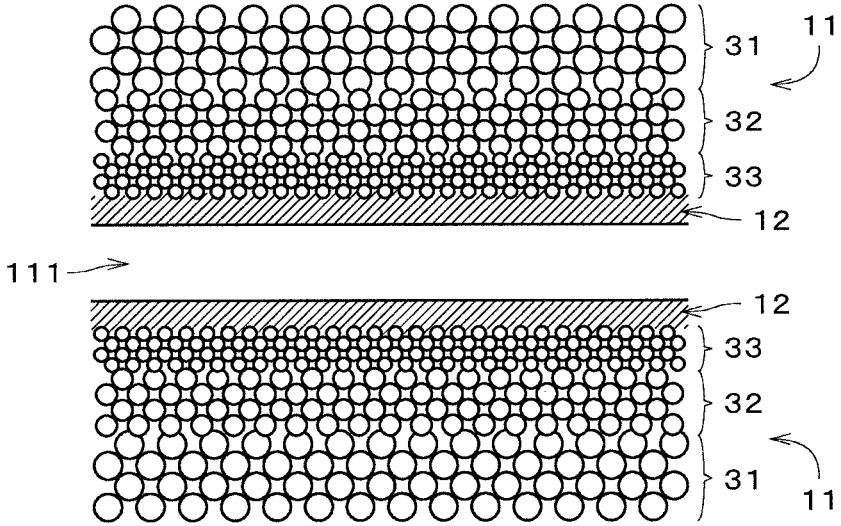
FIG. 2 is a sectional view of part of the separation membrane complex in enlarged dimensions.

FIG. 1 is a sectional view of a separation membrane complex 1 according to one embodiment of the present invention. FIG. 2 is a sectional view of part of the separation membrane complex 1 in enlarged dimensions. The separation membrane complex 1 includes a porous support 11 and a zeolite membrane 12 that is a separation membrane formed on the support 11. The zeolite membrane 12 refers to at least a zeolite formed into a membrane on the surface of the support 11, and does not refer to zeolite particles that are merely dispersed in an organic membrane. The zeolite membrane 12 may contain two or more types of zeolites having different structures or different compositions. In FIG. 1, the zeolite membrane 12 is illustrated with bold lines. In FIG. 2, the zeolite membrane 12 is cross-hatched. In the illustration of FIG. 2, the zeolite membrane 12 has a thickness greater than the actual thickness. Alternatively, the separation membrane complex 1 may include a separation membrane other than the zeolite membrane 12.

The support 11 is a porous member that is permeable to gas and liquid. In the example illustrated in FIG. 1, the support 11 is a monolith support in which an integrally-molded column-like body has a plurality of through holes 111 each extending in the longitudinal direction (i.e., in the right-left direction in FIG. 1). In the example illustrated in FIG. 1, the support 11 has an approximately column-like shape. Each through hole 111 (i.e., cell) may have, for example, an approximately circular cross-sectional shape perpendicular to the longitudinal direction. In the illustration of FIG. 1, the through holes 111 have a diameter greater than the actual diameter, and the number of through holes 111 is smaller than the actual number of through holes 111. The zeolite membrane 12 is formed on the inside surfaces of the through holes 111 and covers approximately the entire inside surfaces of the through holes 111.

The support 11 has a length (i.e., length in the right-left direction in FIG. 1) of, for example, 10 cm to 200 cm. The support 11 has an outer diameter of, for example, 0.5 cm to 30 cm. The distance between the central axes of each pair of adjacent through holes 111 may be in the range of, for example, 0.3 mm to 10 mm. The surface roughness (Ra) of the support 11 may, for example, be in the range of 0.1 μm to 5.0 μm and preferably in the range of 0.2 μm to 2.0 μm. Alternatively, the support 11 may have a different shape such as a honeycomb shape, a flat plate-like shape, a tube-like shape, a cylinder-like shape, a column-like shape, or a polygonal prism shape. In the case where the support 11 has a tube- or cylinder-like shape, the thickness of the support 11 may, for example, be in the range of 0.1 mm to 10 mm.

The material for the support 11 may be any of a variety of substances (e.g., ceramic or metal) as long as the substance has chemical stability during the process of forming the zeolite membrane 12 on the surface. In the present embodiment, the support 11 is formed of a ceramic sintered compact. Examples of the ceramic sintered compact to be selected as the material for the support 11 include alumina, silica, mullite, zirconia, titania, yttrium, silicon nitride, and silicon carbide. In the present embodiment, the support 11 contains at least one type of alumina, silica, and mullite.

The support 11 may include an inorganic binder. The inorganic binder may be at least one of titania, mullite, easily sinterable alumina, silica, glass frit, clay minerals, and easily sinterable cordierite.

The support 11 may have a mean pore diameter of, for example, 0.01 μm to 70 μm and preferably 0.05 μm to 25 μm. The mean pore diameter of the support 11 in the vicinity of the surface on which the zeolite membrane 12 is formed may be in the range of 0.01 μm to 1 μm and preferably in the range of 0.05 μm to 0.5 μm. The mean pore diameter may be measured by, for example, a mercury porosimeter, a perm porosimeter, or a nano-perm porosimeter. Referring to the pore size distribution of the support 11 as a whole including the surface and inside of the support 11, D5 may be in the range of, for example, 0.01 μm to 50 μm, D50 may be in the range of, for example, 0.05 μm to 70 μm, and D95 may be in the range of, for example, 0.1 μm to 2000 μm. The porosity of the support 11 in the vicinity of the surface on which the zeolite membrane 12 is formed may be in the range of, for example, 20% to 60%.

For example, the support 11 may have a multilayer structure in which a plurality of layers having different mean pore diameters are laminated one above another in the thickness direction. The mean pore diameter and sintered particle diameter of a surface layer that includes the surface on which the zeolite membrane 12 is formed are smaller than those of the other layers (layers other than the surface layer). The mean pore diameter of the surface layer of the support 11 may be in the range of, for example, 0.01 μm to 1 μm and preferably in the range of 0.05 μm to 0.5 μm. In the case where the support 11 has a multilayer structure, the material for each layer may be any of the substances described above. The materials for the plurality of layers forming the multilayer structure may be the same, or may be different.

The zeolite membrane 12 is a porous membrane with small pores. The zeolite membrane 12 may be used as a separation membrane that separates a specific substance from a mixture of substances that include a plurality of types of substances, using a molecular-sieving function. The zeolite membrane 12 is less permeable to the other substances than to the specific substance. In other words, the permeance of the zeolite membrane 12 to the other substances is lower than the permeance of the zeolite membrane 12 to the aforementioned specific substance.

The zeolite membrane 12 may have a thickness of, for example, 0.05 μm to 30 μm, preferably 0.1 μm to 20 μm, and more preferably 0.5 μm to 10 μm. Increasing the thickness of the zeolite membrane 12 improves selectivity. Reducing the thickness of the zeolite membrane 12 increases permeance. The surface roughness (Ra) of the zeolite membrane 12 may, for example, be less than or equal to 5 μm, preferably less than or equal to 2 μm, more preferably less than or equal to 1 μm, and yet more preferably less than or equal to 0.5 μm.

The pore diameter of a zeolite crystal contained in the zeolite membrane 12 (hereinafter, also simply referred to as the "pore diameter of the zeolite membrane 12") may be greater than or equal to 0.2 nm and less than or equal to 0.8 nm, more preferably greater than or equal to 0.3 nm and less than or equal to 0.7 nm, and yet more preferably greater than or equal to 0.3 nm and less than or equal to 0.45 nm. In the case where the pore diameter of the zeolite membrane 12 is less than 0.2 nm, the amount of substances that permeate through the zeolite membrane may be reduced, and in the case where the pore diameter of the zeolite membrane 12 is greater than 0.8 nm, the selectivity of substances through the zeolite membrane may become insufficient. The pore diameter of the zeolite membrane 12 refers to the diameter (i.e., minor axis) of a pore in the direction approximately perpendicular to the maximum diameter (i.e., a major axis that is a maximum value of the distance between oxygen atoms) of a pore in the zeolite crystal constituting the zeolite membrane 12. The pore diameter of the zeolite membrane 12 is smaller than the mean pore diameter of the surface of the support 11 on which the zeolite membrane 12 is arranged.

In the case where the zeolite membrane 12 is composed of a maximum n-membered ring zeolite, the minor axis of an n-numbered ring pore is assumed to be the pore diameter of the zeolite membrane 12. In the case where the zeolite has a plurality of types of n-membered ring pores where n is the same number, the minor axis of an n-membered ring pore that has a largest minor axis is assumed to be the pore diameter of the zeolite membrane 12. Note that the n-membered ring refers to a portion in which the number of oxygen atoms constituting the framework of a pore is n and that forms a cyclic structure as a result of each oxygen atom being bonded to a T atom described later. The n-membered ring also refers to a portion that forms a through hole (channel), and does not include a portion that fails to form a through hole. The n-membered ring pore refers to a small pore formed of an n-membered ring. From the viewpoint of improving selectivity, the aforementioned zeolite membrane 12 may preferably contain a maximum 8- or less-membered ring zeolite (e.g., 6- or 8-membered ring zeolite).

The pore diameter of the zeolite membrane is uniquely determined by the framework structure of the zeolite and can be obtained from a value disclosed in the "Database of Zeolite Structures" by the International Zeolite Association, [online], from the Internet <URL:http://www.iza-structure.org/databases/>.

There are no particular limitations on the type of the zeolite of the zeolite membrane 12, and examples of the type of the zeolite include AEI-, AEN-, AFN-, AFV-, AFX-, BEA-, CHA-, DDR-, ERI-, ETL-, FAU-(X-type, Y-type), GIS-, IHW-, LEV-, LTA-, LTJ-, MEL-, MFI-, MOR-, PAU-, RHO-, SOD-, and SAT-type zeolites. In the case where the zeolite is an 8-membered ring zeolite, for example, the zeolite may be an AEI-, AFN-, AFV-, AFX-, CHA-, DDR-, ERI-, ETL-, GIS-, IHW-, LEV-, LTA-, LTJ-, RHO-, or SAT-type zeolite. In the present embodiment, the zeolite of the zeolite membrane 12 is a DDR-type zeolite.

The zeolite of the zeolite membrane 12 may contain, for example, Al as T atoms (i.e., atoms located in the center of an oxygen tetrahedron ($TO_4$) constituting the zeolite). The zeolite of the zeolite membrane 12 may, for example, be a zeolite that contains only silicon (Si) or Si and Al as the T atoms, an AlPO-type zeolite that contains Al and phosphorus (P) as the T atoms, an SAPO-type zeolite that contains Si, Al, and P as the T atoms, an MAPSO-type zeolite that contains magnesium (Mg), Si, Al, and P as the T atoms, or a ZnAPSO-type zeolite that contains zinc (Zn), Si, Al, and P as the T atoms. Some of the T atoms may be replaced by other elements.

The zeolite membrane 12 may contain, for example, Si. For example, the zeolite membrane 12 may contain any two or more of Si, Al, and R The zeolite membrane 12 may contain alkali metal. The alkali metal may, for example, be sodium (Na) or potassium (K). In the case where the zeolite membrane 12 contains Si atoms and Al atoms, the Si/Al ratio in the zeolite membrane 12 may, for example, be higher than or equal to one and lower than or equal to a hundred thousand. The Si/Al ratio is the molar ratio of Si elements to Al elements contained in the zeolite membrane 12. The Si/Al ratio is preferably higher than or equal to 5, more preferably higher than or equal to 20, and yet more preferably higher than or equal to 100. A higher Si/Al ratio is more preferable. The Si/Al ratio in the zeolite membrane 12 may be adjusted by adjusting, for example, the compounding ratio of an Si source and an Al source in a starting material solution described later.

Figure 3:
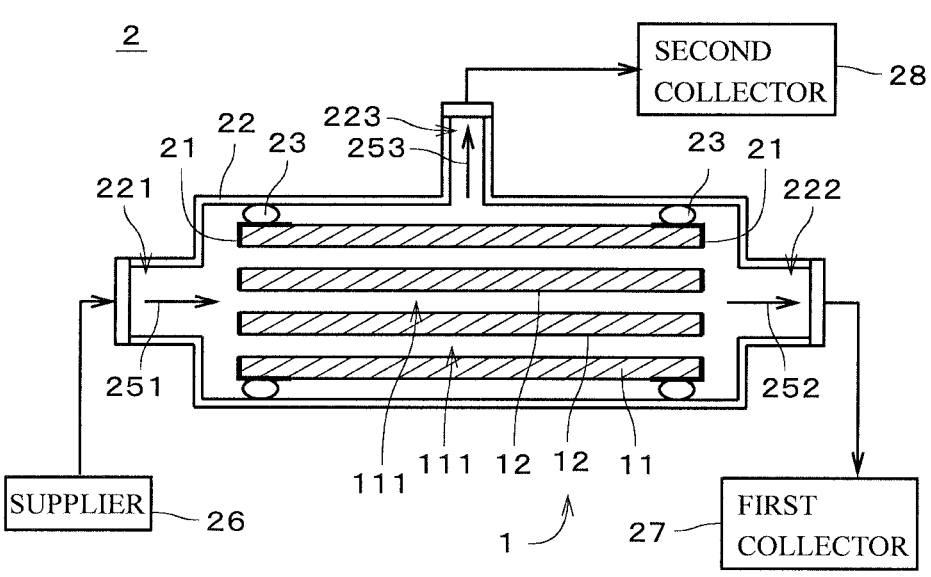
FIG. 3 is an illustration of a separation device.
Figure 4:
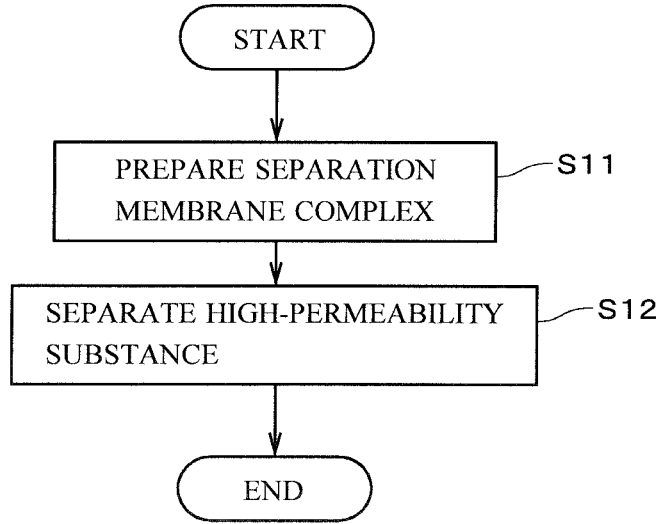
FIG. 4 is a flowchart of the separation of a mixture of substances.

Next, the separation of a mixture of substances using the separation membrane complex 1 will be described with reference to FIGS. 3 and 4. FIG. 3 is an illustration of the separation device 2. FIG. 4 is a flowchart of the separation of the mixture of substances using the separation device 2.

The separation device 2 supplies a mixture of substances that include a plurality of types of fluid (i.e., gas or liquid) to the separation membrane complex 1 and causes a substance with high permeability in the mixture of substances to pass through the separation membrane complex 1 and to be separated from the mixture of substances. For example, the separation device 2 may perform this separation for the purpose of extracting a substance with high permeability (hereinafter, also referred to as a "high permeability substance) from the mixture of substances or for the purpose of concentrating a substance with low permeability (hereinafter, also referred to as a "low permeability substance").

The mixture of substances (i.e., a fluid mixture) may be a mixed gas that includes a plurality of types of gas, may be a mixed solution that includes a plurality of types of liquid, or may be a gas-liquid two-phase fluid that includes both gas and liquid.

For example, the mixture of substances may include one or more types of substances selected from among hydrogen ($H_2$), helium (He), nitrogen ($N_2$), oxygen ($O_2$), water ($H_2O$), water vapor ($H_2O$), carbon monoxide (CO), carbon dioxide ($CO_2$), nitrogen oxides, ammonia ($NH_3$), sulfur oxides, hydrogen sulfide ($H_2S$), sulfur fluorides, mercury (Hg), arsine ($AsH_3$), hydrogen cyanide (HCN), carbonyl sulfide (COS), C1 to C8 hydrocarbons, organic acid, alcohol, mercaptans, ester, ether, ketone, and aldehyde. The aforementioned high-permeability substance may, for example, be one or more types of substances selected from among $H_2$, $N_2$, $O_2$, $H_2O$, $Co_2$, and $H_2S$.

Nitrogen oxides are compounds of nitrogen and oxygen. For example, the aforementioned nitrogen oxides may be gases called NOx such as nitrogen monoxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), or dinitrogen pentoxide ($N_2O_5$).

Sulfur oxides are compounds of sulfur and oxygen. For example, the aforementioned sulfur oxides may be gases called SOx such as sulfur dioxide ($SO_2$) or sulfur trioxide ($SO_3$).

Sulfur fluorides are compounds of fluorine and sulfur. For example, the aforementioned sulfur fluorides may be disulfur difluoride (F—S—S—F, S=$SF_2$), sulfur difluoride (SF$_2$), sulfur tetrafluoride (SF$_4$), sulfur hexafluoride (SF$_6$), or disulfur decafluoride (S$_2$F$_{10}$).

C1 to C8 hydrocarbons are hydrocarbons that contain one or more and eight or less carbon atoms. C3 to C8 hydrocarbons each may be any of a linear-chain compound, a side-chain compound, and a cyclic compound. C2 to C8 hydrocarbons each may be either of a saturated hydrocarbon (i.e., where double bonds and triple bonds are not located in molecules) and an unsaturated hydrocarbon (i.e., where double bonds and/or triple bonds are located in molecules). C1 to C4 hydrocarbons may, for example, be methane (CH$_4$), ethane (C$_2$H$_6$), ethylene (C$_2$H$_4$), propane (C$_3$H$_8$), propylene (C$_3$H$_6$), normal butane (CH$_3$(CH$_2$)$_2$CH$_3$), isobutene (CH(CH$_3$)$_3$), 1-butene (CH$_2$=CHCH$_2$CH$_3$), 2-butene (CH$_3$CH=CHCH$_3$), or isobutene (CH$_2$=C (CH$_3$)$_2$).

The aforementioned organic acid may, for example, be carboxylic acid or sulfonic acid. For example, carboxylic acid may be formic acid (CH$_2$O$_2$), acetic acid (C$_2$H$_4$O$_2$), oxalic acid (C$_2$H$_2$O$_4$), acrylic acid (C$_3$H$_4$O$_2$), or benzoic acid (C$_6$H$_5$COOH). Sulfonic acid may, for example, be ethane sulfonic acid (C$_2$H$_6$O$_3$S). The organic acid may be a chain compound, or may be a cyclic compound.

The aforementioned alcohol may, for example, be methanol (CH$_3$OH), ethanol (C$_2$H$_5$OH), isopropanol (2-propanol) (CH$_3$CH(OH)CH$_3$), ethylene glycol (CH$_2$(OH)CH$_2$(OH)), or butanol (C$_4$H$_9$OH).

Mercaptans are organic substances with terminal sulfur hydrides (SH) and are substances called also thiol or thioalcohol. The aforementioned mercaptans may, for example, be methyl mercaptan (CH$_3$SH), ethyl mercaptan (C$_2$H$_5$SH), or 1-propane thiol (C$_3$H$_7$SH).

The aforementioned ester may, for example, be formic acid ester or acetic acid ester.

The aforementioned ether may, for example, be dimethyl ether ((CH$_3$)$_2$O), methyl ethyl ether (C$_2$H$_5$OCH$_3$), or diethyl ether ((C$_2$H$_5$)$_2$O).

The aforementioned ketone may, for example, be acetone ((CH$_3$)$_2$CO), methyl ethyl ketone (C$_2$H$_5$COCH$_3$), or diethyl ketone ((C$_2$H$_5$)$_2$CO).

The aforementioned aldehyde may, for example, be acetaldehyde (CH$_3$CHO), propionaldehyde (C$_2$H$_5$CHO), or butanal (butyraldehyde) (C$_3$H$_7$CHO).

The following description is given on the assumption that the mixture of substances that is subjected to separation by the separation device 2 is a mixed gas that includes a plurality of type of gas.

The separation device 2 includes the separation membrane complex 1, a sealer 21, an outer cylinder 22, two seal members 23, a supplier 26, a first collector 27, and a second collector 28. The separation membrane complex 1, the sealer 21, and the seal members 23 are placed in the internal space of the outer cylinder 22. The supplier 26, the first collector 27, and the second collector 28 are arranged outside the outer cylinder 22 and connected to the outer cylinder 22. FIG. 1 omits an illustration of cross hatching in the section of part of the configuration.

The sealer 21 is a member that is attached to both ends of the support 11 in the longitudinal direction (i.e., in the left-right direction in FIG. 3) to cover and seal both end faces of the support 11 in the longitudinal direction and the outside surface of the support 11 in the vicinity of the both end faces. The sealer 21 prevents the inflow and outflow of gas and liquid from the both end faces of the support 11. For example, the sealer 21 may be a plate-like or membranous member formed of glass or resin. The material and shape of the sealer 21 may be appropriately changed. Note that the sealer 21 has a plurality of openings that overlap with the plurality of through holes 111 of the support 11, so that both ends of each through hole 111 of the support 11 in the longitudinal direction are not covered with the sealer 21. This allows the inflow and outflow of gas and liquid from the both ends into and out of the through holes 111.

There are no particular limitations on the shape of the outer cylinder 22, and the outer cylinder 22 may be a generally cylindrical tube-like member. For example, the outer cylinder 22 may be formed of stainless steel or carbon steel. The longitudinal direction of the outer cylinder 22 is approximately parallel to the longitudinal direction of the separation membrane complex 1. One end of the outer cylinder 22 in the longitudinal direction (i.e., the end on the left side in FIG. 3) has a supply port 221, and the other end thereof has a first exhaust port 222. The side face of the outer cylinder 22 has a second exhaust port 223. The supply port 221 is connected to the supplier 26. The first exhaust port 222 is connected to the first collector 27. The second exhaust port 223 is connected to the second collector 28. The internal space of the outer cylinder 22 is an enclosed space isolated from the space around the outer cylinder 22.

The two seal members 23 are arranged around the entire circumference between the outside surface of the separation membrane complex 1 and the inside surface of the outer cylinder 22 in the vicinity of the both ends of the separation membrane complex 1 in the longitudinal direction. Each seal member 23 is an approximately ring-shaped member formed of a material that is impermeable to gas and liquid. For example, the seal members 23 may be O-rings formed of resin having flexibility. The seal members 23 are in tight contact with the outside surface of the separation membrane complex 1 and the inside surface of the outer cylinder 22 along the entire circumference. In the example illustrated in FIG. 3, the seal members 23 are in tight contact with the outside surface of the sealer 21 and are indirectly in tight contact with the outside surface of the separation membrane complex 1 via the sealer 21. The space between the seal members 23 and the outside surface of the separation membrane complex 1 and the space between the seal members 23 and the inside surface of the outer cylinder 22 are sealed so as to almost or completely disable the passage of gas and liquid.

The supplier 26 supplies a mixed gas to the internal space of the outer cylinder 22 via the supply port 221. For example, the supplier 26 may include a force-feed mechanism such as a blower or a pump that pumps the mixed gas toward the outer cylinder 22. The force-feed mechanism includes a temperature regulator and a pressure controller that control respectively the temperature and pressure of the mixed gas supplied to the outer cylinder 22. The first collector 27 and the second collector 28 may include, for example, a reservoir that stores gas delivered from the outer cylinder 22, or a blower or a pump that transfers the gas.

In the separation of the mixed gas, first, the separation membrane complex 1 is prepared (FIG. 4: step S11). Specifically, the separation membrane complex 1 is mounted on the inside of the outer cylinder 22. Then, a mixed gas that includes a plurality of types of gas having different permeability to the zeolite membrane 12 is supplied from the supplier 26 to the inside of the outer cylinder 22 as indicated by an arrow 251. For example, the mixed gas is composed primarily of CO$_2$ and CH$_4$. The mixed gas may also include gas other than CO$_2$ and CH$_4$. The pressure of the mixed gas supplied from the supplier 26 to the outer cylinder 22 (i.e., supply-side pressure) may be in the range of, for example, 0.1 MPaG to 20.0 MPaG. The temperature of the mixed gas supplied from the supplier 26 may be in the range of, for example, 10° C. to 250° C.

The mixed gas supplied from the supplier 26 to the outer cylinder 22 is introduced from the left end of the separation membrane complex 1 in the drawing into each through hole 111 of the support 11. The gas with high permeability in the mixed gas, i.e., the high permeability substance, permeates through the zeolite membrane 12 provided on the inside surface of each through hole 111 and through the support 11 and is exhausted from the outside surface of the support 11. Accordingly, the high permeability substance (e.g., $CO_2$) is separated from gas with low permeability in the mixed gas, i.e., a low permeability substance (e.g., $CH_4$) (step S12).

The gas exhausted out of the outside surface of the support 11 (hereinafter, referred to as "permeated substance") is guided via the second exhaust port 223 to the second collector 28 and collected by the second collector 28 as indicated by an arrow 253. The pressure of the gas collected by the second collector 28 (i.e., permeation-side pressure) may, for example, be 0.0 MPaG. The permeated substance may further include, in addition to the aforementioned high-permeability substance, a low-permeability substance that has permeated through the zeolite membrane 12

In the mixed gas, gas (hereinafter, referred to as "non-permeated substance") other than the substance that has permeated through the zeolite membrane 12 and the support 11 passes through each through hole 111 of the support 11 from the left side to the right in the drawing and collected by the first collector 27 via the first exhaust port 222 as indicated by an arrow 252. For example, the pressure of the gas collected by the first collector 27 may be approximately the same as the initial pressure. The non-permeated substance may further include, in addition to the aforementioned low-permeability substance, a high-permeability substance that has not permeated through the zeolite membrane 12. For example, the non-permeated substance collected by the first collector 27 may be circulated into the supplier 26 and supplied again to the inside of the outer cylinder 22.

As described above, conventionally the zeolite membrane 12 has voids (also referred to as "defects") that allow passage of a low-permeability substance that is not likely to permeate through small pores in the zeolite. Thus, during the separation of the mixed gas, the low-permeability substance that has passed through these voids are mixed with the permeated substance that has permeated through the zeolite membrane 12. In other words, these voids reduce the separation ratio of the zeolite membrane 12 (i.e., the value obtained by dividing the permeance to the high-permeability substance by the permeance to the low-permeability substance). This decrease in separation ratio becomes noticeable under high differential pressure conditions having a relatively great difference between the supply-side pressure and the permeation-side pressure.

As a result of eager consideration, the inventors of the present application have found that the aforementioned voids in the zeolite membrane 12 can be classified into two types of voids that have different influences on the decrease in separation ratio. Specifically, the voids in the zeolite membrane 12 can be classified into first voids and second voids, the first voids being voids where the permeance to a low-permeability substance remains approximately the same under both of the aforementioned high differential pressure conditions and low differential pressure conditions having a relatively small difference (e.g., a pressure difference of 0.3 MPa) between the supply-side pressure and the permeation-side pressure, and the second voids being voids where the permeance to the low-permeability substance under the high differential pressure conditions is significantly higher than that under the low differential pressure conditions. Hereinafter, the first voids are referred to as "small voids," and the second voids are referred to as "large voids." In the present application, the low differential pressure conditions refer to the case where the aforementioned pressure difference (i.e., the value obtained by subtracting the permeation-side pressure from the supply-side pressure) is less than 1 MPa, and the high differential pressure conditions refer to the case where the aforementioned pressure difference is greater than or equal to 1 MPa.

Figure 5:
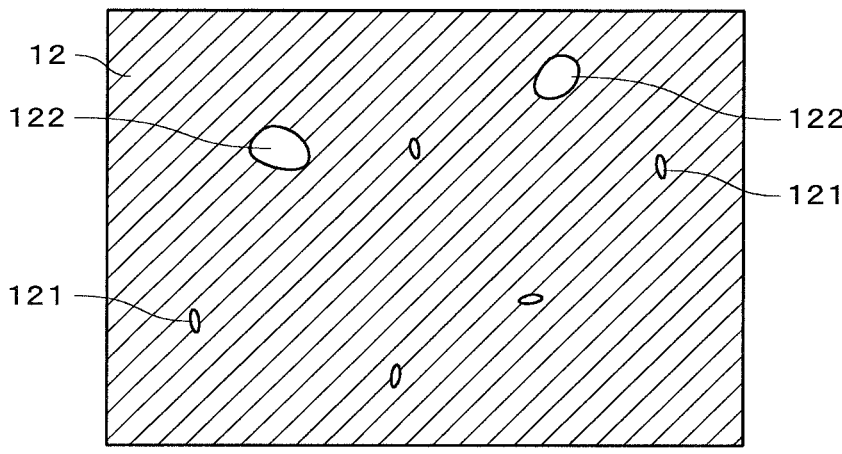
FIG. 5 is a conceptual diagram illustrating part of the surface of a zeolite membrane.

FIG. 5 is a conceptual diagram illustrating part of the surface of the zeolite membrane 12. In FIG. 5, the surface of the zeolite membrane 12 is cross-hatched. In the example illustrated in FIG. 5, the zeolite membrane 12 has a plurality of small voids 121 and a plurality of large voids 122. In the case of the small voids 121, the gaseous diffusion mechanism is Knudsen flow, and the gas permeance $F_k$ (mol/($m^2 \cdot Pa \cdot sec$)) is expressed by Expression 1 below. In the case of the large voids 122, on the other hand, the gaseous diffusion mechanism is Poiseuille flow, and the gas permeance $F_p$ (mol/($m^2 \cdot Pa \cdot sec$)) is expressed by Expression 2 below. The gas permeance $F_k$ and the gas permeance $F_p$ refer to the fluxes of gas per unit area and per unit pressure difference.

$$F_k = \frac{8}{3}\sqrt{\frac{1}{2\pi MRT}}\frac{r_k}{L} \qquad \text{Expression 1}$$

$$F_p = \frac{r_p^2}{8L\mu RT}(P_h + P_l) \qquad \text{Expression 2}$$

In Expression 1, $r_k$ is the radius (m) of one small void 121, L is the reference length of the small voids 121 (i.e., the thickness of the zeolite membrane 12) (m), M is the molar mass (kg/mol) of gas, R is the gas constant (J/(K·mol)), and T is the absolute temperature (K). The radius $r_k$ of a small void 121 refers to the radius of the small void 121 that is approximated to a circle when the surface of the zeolite membrane 12 is viewed in the direction perpendicular to the surface. In Expression 2, $r_p$ is the radius (m) of one large void 122, L is the reference length of the large voids 122 (i.e., the thickness of the zeolite membrane 12) (m), μ is the gas viscosity (Pa·sec), R is the gas constant (J/(K·mol)), T is the absolute temperature (K), $P_h$ is the supply-side pressure (PaA), and $P_l$ is the permeation-side pressure (PaA). The radius $r_p$ of a large void 122 refers to the radius of the large void 122 that is approximated to a circle when the surface of the zeolite membrane 12 is viewed in the direction perpendicular to the surface. Although, in Expressions 1 and 2, the reference length L of the small voids 121 and the reference length L of the large voids 122 are regarded as the thickness of the zeolite membrane 12, the actual lengths of the small voids 121 and the large voids 122 are not always equal to the thickness of the zeolite membrane 12.

An absolute value $j_k$ (mol/(Pa·sec)) of the flux per unit pressure difference of gas passing through one small void 121 is obtained by multiplying the permeance $F_k$ by the area $S_k$ of the small void 121 ($=\pi \cdot r k^2$) as indicated by Expression 3 below. An absolute value $j_p$ (mol/(Pa·sec)) of the flux per unit pressure difference of gas passing through the large void 122 is obtained by multiplying the permeance $F_p$ by the area $S_p$ ($=\pi \cdot r p^2$) of the small voids 121 as indicated by Expression 4 below. Hereinafter, the absolute values $j_k$ and $j_p$ of the flux per unit pressure difference are also simply referred to as "fluxes $j_k$ and $j_p$."

$$j_k = \frac{8}{3}\sqrt{\frac{1}{2\pi MRT}}\frac{r_k}{L} \times \pi r_k^2 = \qquad \text{Expression 3}$$

$$\frac{8}{3}\sqrt{\frac{1}{2MRT}}\frac{1}{L} \times \sqrt{\pi}\, r_k^3 = \frac{8S_k^{1.5}}{3\pi L\sqrt{2MRT}}$$

$$j_p = \frac{r_p^2}{8L\mu RT}(P_h + P_l)\times \pi r_p^2 = \qquad \text{Expression 4}$$

$$\frac{1}{8L\mu RT}(P_h + P_l)\times \pi r_p^4 = \frac{S_p^2}{8\pi L\mu RT}(P_h + P_l)$$

As indicated by Expressions 1 and 3, the permeance $F_k$ and the flux $j_k$ of the small voids 121 are affected by neither the supply-side pressure nor the permeation-side pressure. On the other hand, as indicated by Expressions 2 and 4, the permeance $F_p$ and flux $j_p$ of the large voids 122 increase with increasing supply-side pressure and permeation-side pressure.

The inventors of the present application have also found that the areas of the large voids 122 and the areas of the small voids 121 in the zeolite membrane 12 affect the separation ratio in the separation membrane complex 1 and the permeance to a high-permeability substance. Specifically, as the total area of the large voids 122 in the zeolite membrane 12 increases, the separation ratio of a high-permeability substance and a low-permeability substance in the separation membrane complex 1 decreases. Also, if an approach is made to decrease the area of the small voids 121 in the zeolite membrane 12, the zeolite membrane 12 will become thicker, and the permeance of the high-permeability substance in the separation membrane complex 1 decreases.

In view of this, the inventors of the present application have given attention to a large void index $I_p$ that indicates the abundance ratio of the large voids 122 in the zeolite membrane 12 and a small void index $I_k$ that indicates the abundance ratio of the small voids 121 in the zeolite membrane 12. The small void index $I_k$ is expressed by Expression 5 below, where $S_m$ (m²) is the surface area of the zeolite membrane 12 and $S_k$ (m²) is the area of each small void 121 (i.e., the area per small void 121). The large void index $I_p$ is expressed by Expression 6 below, where $S_m$ (m²) is the surface area of the zeolite membrane 12 and $S_p$ (m²) is the area of each large void 122 (i.e., the area per large void 122).

$$I_k = \frac{\sum\left(S_k^{1.5}\right)}{S_m^{1.5}} \qquad \text{Expression 5}$$

$$I_p = \frac{\sum\left(S_p^2\right)}{S_m^2} \qquad \text{Expression 6}$$

The surface area $S_m$ of the zeolite membrane 12 is the area of the entire exposed surface of the zeolite membrane 12 that is exposed through the through holes 111 in FIG. 2. In other words, the surface area $S_m$ of the zeolite membrane 12 is the area of the entire region where the zeolite membrane 12 is formed. In the example illustrated in FIG. 5, the surface area of the zeolite membrane 12 is the area of the entire rectangular region in FIG. 5 and takes a value that also includes the areas of a plurality of large voids 122 and a plurality of small voids 121.

In the separation membrane complex 1, the large void index $I_p$ is set to be lower than $200\times10^{-22}$. In this way, reducing the number of large voids 122 in the separation membrane achieves a high separation ratio in the separation membrane complex 1. Preferably, the large void index $I_p$ may be set to be lower than $100\times10^{-22}$. This improves the separation ratio. In the separation membrane complex 1, the small void index $I_k$ is set to be higher than or equal to $10\times10^{-15}$. In this way, increasing the number of small voids 121 in the zeolite membrane 12 to some extent suppresses a decrease in the permeance of the separation membrane complex 1 to the high-permeability substance. Preferably, the small void index $I_k$ may be set to be higher than or equal to $20\times10^{-15}$. This further suppresses a decrease in permeance to the high-permeability substance. There are not particular limitations on the upper limit for the small void index $I_k$, but an excessively high small void index $I_k$ may lead to the aforementioned decrease in separation ratio. From the viewpoint of suppressing a decrease in separation ratio, the small void index $I_k$ may preferably be lower than or equal to $5000\times10^{-15}$.

Figure 6:
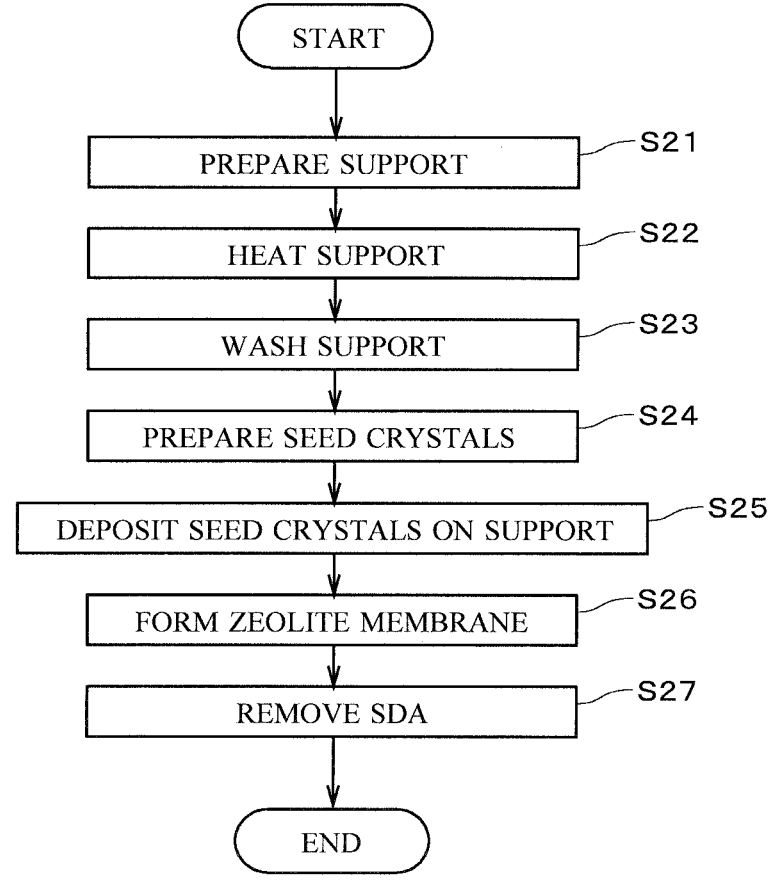
FIG. 6 is a flowchart of the production of a separation membrane complex.

Next, one example of the procedure for producing the separation membrane complex 1 will be described with reference to FIG. 6. In the production of the separation membrane composite 1, first, the porous support 11 is formed and prepared (step S21). In step S21, for example, starting materials that include the material for the aggregate of the support 11, a pore forming material, and a binder are prepared and mixed. Then, water is charged into the starting materials, and the starting materials and water are kneaded into a green body by a kneader. Next, the green body is molded by an extruder or any other means to obtain a compact with a plurality of through holes 111 (see FIG. 1). Note that a molding method other than extrusion molding may be used to form the compact. The compact is dried, degreased, and then fired. Accordingly, the aforementioned support 11 is formed. The temperature during the process of firing the outermost surface layer of the compact (i.e., firing temperature) may be in the range of, for example, 1200° C. to 1300° C., and it is 1250° C. in the present embodiment. The firing time may be in the range of, for example, 6 to 10 hours. Conditions for the process of firing the compact may be changed as appropriate.

After step S21 ends, the support 11 is heated at a pretreatment temperature (step S22). This allow impurities adhering to the support 11, such as organic substances, to be burnt and/or decomposed and removed from the support 11. The heating processing in step S22 may be performed under, for example, atmospheric pressure. Preferably, the pretreatment temperature may be higher than or equal to 400° C. and lower than 80% of the aforementioned firing temperature of the support 11 in step S21. Note that the ratio (%) of the pretreatment temperature to the firing temperature is the ratio using the Celsius scale. If the pretreatment temperature is lower than 400° C., the combustion and decomposition of, for example, organic substances may become insufficient. If the pretreatment temperature is higher than or equal to 80% of the firing temperature of the support 11, the firing of the support 11 may progress and produce adverse effect on the production of the zeolite membrane 12 in step S26. The heating time in step S22 may be in the range of, for example, 2 to 36 hours.

After step S22 ends, the support 11 is washed with a fluid (step S23). Accordingly, residues or the like such as organic substances that have been burnt and/or decomposed in step S22 are washed away from the support 11. This fluid may, for example, be liquid such as water or alcohol, or may be gas such as air. As another alternative, both liquid and gas may be used to wash the support 11. For example, a first washing process may be performed by passing 100 mL of ethanol over the surface of the support 11, and then a second washing process may be performed by passing air over the surface of the support 11 for one minute with a drier.

After step S23 ends, seed crystals that are used to produce the zeolite membrane 12 are synthesized and prepared (step S24). In the synthesis of the seed crystals, starting materials such as an Si source and a structure-directing agent (hereinafter, also referred to as an "SDA") are dissolved or dispersed in a solvent so as to prepare a starting material solution of the seed crystals. Then, the starting material solution is subjected to hydrothermal synthesis, and resultant crystals are washed and dried to obtain zeolite powder (e.g., DDR-type zeolite powder). The zeolite powder may be used as-is as the seed crystals, or the seed crystals may be obtained by processing the above powder by, for example, pulverization. Note that step S24 may be performed in parallel with steps S21 to S23, or may be performed before steps S21 to S23.

Then, the seed crystals are deposited on the inside surfaces of the through holes 111 in the support 11 (step S25). For example, the seed crystals may be deposited on the support 11 by immersing the porous support 11 in a dispersion liquid in which the seed crystals are dispersed in a solvent (e.g., water or alcohol such as ethanol). The immersion of the support 11 in the dispersion liquid may be repeated a plurality of number of times. Alternatively, the seed crystals may be deposited on the support 11 by any other method different from the method described above.

The support 11 with the seed crystals deposited thereon is immersed in a starting material solution. The starting material solution may be prepared by, for example, dissolving substances such as an Si source and an SDA in a solvent. The composition of the starting material solution may, for example, be 1.0 $SiO_2$:0.015 SDA:0.12 $(CH_2)_2(NH_2)_2$. The solvent in the starting material solution may, for example, be water or alcohol such as ethanol. In the case where water is used as the solvent of the starting material solution, the molar ratio of the SDA to the water contained in the starting material solution may preferably be lower than or equal to 0.01. The molar ratio of the SDA to the water contained in the starting material solution may also preferably be higher than or equal to 0.00001. The SDA contained in the starting material solution may, for example, be an organic substance. The SDA may, for example, be 1-adamantanamine.

Then, the DDR-type zeolite is grown by hydrothermal synthesis using the aforementioned seed crystals as nuclei, so as to form the DDR-type zeolite membrane 12 on the support 11 (step S26). The temperature at the time of the hydrothermal synthesis may preferably be in the range of 120 to 200° C. and may, for example, be 160° C. The hydrothermal synthesis time may, for example, be in the range of 5 to 100 hours and may, for example, be 30 hours.

When the hydrothermal synthesis is completed, the support 11 and the zeolite membrane 12 are washed with deionized water. After the washing, the support 11 and the zeolite membrane 12 are dried at, for example, 80° C. After the drying of the support 11 and the zeolite membrane 12, the zeolite membrane 12 is subjected to heat treatment so as to almost completely burn and remove the SDA in the zeolite membrane 12 and to cause microspores in the zeolite membrane 12 to come through the zeolite membrane 12

(step S27). In this way, the aforementioned separation membrane complex 1 is obtained.

As described above, in the production of the separation membrane complex 1, substances such as organic substances or resides are removed from the surface of the support 11 by execution of steps S21 and S23. Therefore, in step S25, the seed crystals can be uniformly and densely deposited on the surface of the support 11. This suppresses the formation of the large voids 122 during the formation of the zeolite membrane 12 in step S26, the large voids being formed as a result of substances such as organic substances or residues inhibiting the deposition of the seed crystals. On the other hand, the total area of the small voids 121 does not change so much, irrespective of whether steps S22 and S23 are executed or not, because the formation of the small voids 121 depend on factors such as the hydrothermal synthesis time and the temperature during the hydrothermal synthesis in step S26.

Next, the relationship of the large void index $I_p$, the small void index $I_k$, and permeability in the separation membrane complex 1 according to Examples 1 to 5 will be described with reference to Table 1. The same is described for Comparative Examples 1 and 2.

TABLE 1

| | Large Void Index $I_p$ ($\times 10^{-22}$) | Small Void Index $I_k$ ($\times 10^{-15}$) | $CH_4$ Permeance Ratio (@8 MPaG/ @0.3 MPaG) | $CO_2$ Relative Permeance (@0.3 MPaG) |
|---|---|---|---|---|
| Example 1 | 4.13 | 31.4 | 0.80 | 1 |
| Example 2 | 14.6 | 28.0 | 0.83 | 0.8 |
| Example 3 | 62.8 | 41.1 | 1.1 | 0.7 |
| Example 4 | 169 | 59.7 | 1.2 | 1.0 |
| Example 5 | 3.74 | 14.7 | 0.81 | 0.6 |
| Comparative Example 1 | 404 | 44.4 | 2.6 | 0.9 |
| Comparative Example 2 | 6.73 | 3.60 | 0.85 | 0.3 |

The large void index $I_p$ and small void index $I_k$ of the separation membrane complex 1 were obtained by the following method. First, $CF_4$ was supplied to the separation membrane complex 1, using the aforementioned separation device 2, in order to measure the flux (mol/(Pa·sec)) of $CF_4$ passing through the zeolite membrane 12 and the support 11 per unit pressure difference. Then, the supply-side pressure of the separation device 2 was changed a predetermined number of times, and the measurement of the flux per unit pressure difference was repeated. Specifically, the $CF_4$ flux per unit pressure difference was measured in the case where the supply-side pressure was 0.2 MPaA, 0.4 MPaA, 0.6 MPaA, and 0.8 MPaA. The temperature at which $CF_4$ was supplied was set to 25° C., and the permeation-side pressure was set to 0.1 MPaA.

Figure 7:
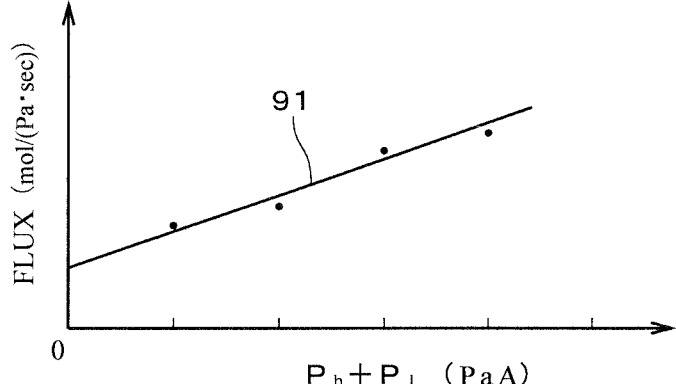
FIG. 7 is a diagram illustrating a relationship between permeance and total pressure of supply-side pressure and permeation-side pressure.

Thereafter, the results of measurement were plotted as illustrated in FIG. 7 in order to obtain the inclination and intercept of an approximated straight line 91 by the least-squares method. The horizontal axis indicates the total pressure $(P_h+P_l)$ (PaA) of the supply-side pressure and the permeation-side pressure, and the vertical axis indicates the aforementioned flux (mol/(Pa·sec)) of $CF_4$ per unit pressure difference.

Since $CF_4$ is unlikely to permeate through small pores in the DDR-type zeolite of the zeolite membrane 12, it can be considered that $CF_4$ has permeated through the large voids 122 and small voids 121 in the zeolite membrane 12. Thus, the aforementioned flux J of $CF_4$ per unit pressure difference is expressed by Expression 7.

$$J = \sum(j_p) + \sum(j_k) = \frac{\sum(S_p^2)}{8\pi L \mu RT}(P_h + P_l) + \frac{8\sum(S_k^{1.5})}{3\pi L \sqrt{2MRT}}$$

Expression 7

The inclination of the aforementioned approximated straight line 91 is the coefficient of the first term on the right side of Expression 7, and the intercept of the approximated straight line 91 is the second term on the right side of Expression 7. Thus, the small void index $I_k$ and the large void index $I_p$ expressed respectively by Expression 5 and Expression 6 described above are obtained from the intercept and inclination of the approximated straight line 91. As described above, the thickness of the zeolite membrane 12 was used as the reference length L in Expression 7. The thickness of the zeolite membrane 12 was assumed to be an arithmetical mean of the membrane thickness obtained by observing scanning electron microscope (SEM) images captured at three points in a section of the separation membrane complex 1. Viscosity μ of $CF_4$ was obtained from the Chapman-Enskog equation. Parameters used in the calculation of the viscosity μ were described in the 7th revised edition of Journal of Chemical Engineering of Japan on pages 69 to 71.

Alternatively, in the case of obtaining the large void index $I_p$ and the small void index $I_k$, it is possible to use, instead of $CF_4$, gas that can permeate through the large voids 122 and the small voids 121 but that does not permeate through portions of the zeolite membrane 12 other than voids. As another alternative, the permeation-side pressure may be changed, instead of the supply-side pressure, or both of the supply-side pressure and the permeation-side pressure may be changed.

In Table 1, the $CH_4$ permeance ratio was obtained by supplying a 25-degree Celsius mixed gas that contains 50% by volume of $CO_2$ and 50% by volume of $CH_4$ to the separation membrane complex 1 while changing the supply-side pressure by the separation device 2, and measuring the $CH_4$ flux (mol/sec). Specifically, first, the $CH_4$ flux (mol/(Pa·sec)) per unit pressure difference was obtained by dividing the measured $CH_4$ flux (mol/sec) by a value that was obtained by subtracting the permeation-side partial pressure of $CH_4$ from the supply-side partial pressure of $CH_4$ (i.e., a difference in partial pressure of $CH_4$) (Pa). Then, a value obtained by dividing the $CH_4$ flux per unit pressure difference for the supply-side pressure of 8.0 MPaG by the $CH_4$ flux per unit pressure difference for the supply-side pressure of 0.3 MPaG was determined as the $CH_4$ permeance ratio. The permeation-side pressure was set to 0.0 MPaG. Note that the $CH_4$ permeance (i.e., the gas flux per unit area and per unit pressure difference) (mol/(m²·Pa·sec)) was obtained by dividing the aforementioned $CH_4$ flux per unit pressure difference by the surface area of the zeolite membrane 12. In other words, the $CH_4$ permeance ratio was obtained by dividing the $CH_4$ permeance under high differential pressure conditions (pressure difference of 8.0 MPa) by the $CH_4$ permeance under low differential pressure conditions (pressure difference of 0.3 MPa).

In Table 1, the $CO_2$ relative permeance was obtained by, when the supply-side pressure was set to 0.3 MPaG and the permeation-side pressure was set to 0.0 MPaG, supplying a 25-degree Celsius mixed gas that contains 50% by volume of $CO_2$ and 50% by volume of $CH_4$ to the separation membrane complex 1 in order to measure the $CO_2$ flux per unit pressure difference and then dividing the measured $CO_2$ flux per unit pressure difference by the $CO_2$ flux per unit pressure difference in Example 1.

In Examples 1 to 5, the separation membrane complex 1 was produced by the production method illustrated as steps S21 to S27 described above. In Example 1, the pretreatment temperature was 500° C. and the heating time was 24 hours in step S22. In Example 2, the pretreatment temperature was 450° C. and the heating time was 18 hours in step S22. In Example 3, the pretreatment temperature was 420° C. and the heating time was 12 hours in step S22. In Example 4, the pretreatment temperature was 400° C. and the heating time was 4 hours in step S22. In Example 5, the pretreatment temperature and the heating time in step S22 were set to be the same as those in Example 2, and the hydrothermal synthesis time of the zeolite membrane 12 in step S26 was increased so as to make the large void index $I_p$ approximately the same as that in Example 1. In Comparative Examples 1 and 2, the separation membrane complex 1 was produced by a production method approximately similar to the production method used in Examples 1 to 5, except that the heat treatment in step S22 and the cleaning processing in step S23 were omitted. In Comparative Example 2, the hydrothermal synthesis time of the zeolite membrane 12 in step S26 was increased so as to make the large void index $I_p$ approximately the same as that in Example 1.

In Examples 1 to 5, the large void index $I_p$ was in the range of $3.74\times10^{-22}$ to $169\times10^{-22}$ (i.e., lower than $200\times10^{-22}$), and the small void index $I_k$ was in the range of $14.7\times10^{-15}$ to $59.7\times10^{-15}$ (i.e., higher than $0\times10^{-15}$). The $CH_4$ permeance ratio was in the range of 0.80 to 1.2 (i.e., lower than 1.9) and low, and the leakage of $CH_4$ was suppressed even under high differential pressure conditions. Thus, the separation membrane complex 1 achieved a high separation ratio. The $CO_2$ relative permeance was in the range of 0.6 to 1.0 and high. Thus, the separation membrane complex 1 achieved high separation capability.

In Examples 1 to 3 and 5, the large void index $I_p$ was in the range of $3.74\times10^{-22}$ to $62.8\times10^{-22}$ (i.e., lower than $100\times10^{-22}$) and lower than the large void index $I_p$ of $169\times10^{-22}$ in Example 4. In Examples 1 to 3 and 5, the $CH_4$ permeance ratio was in the range of 0.80 to 1.1 and lower than the $CH_4$ permeance ratio of 1.2 in Example 4. That is, in Examples 1 to 3 and 5, the leakage of $CH_4$ was further suppressed under high differential pressure conditions.

In Examples 1 to 4, the small void index $I_k$ was in the range of $28.0\times10^{-15}$ to $59.7\times10^{-15}$ (i.e., higher than or equal to $20\times10^{-15}$) and higher than the small void index $I_k$ of $14.7\times10^{-15}$ in Example 5. In Examples 1 to 4, the $CO_2$ relative permeance was in the range of 0.7 to 1.0 and higher than the $CO_2$ relative permeance of 0.6 in Example 5. That is, in Examples 1 to 4, the separation membrane complex 1 achieved higher separation capability.

In Comparative Example 1, on the other hand, the large void index $I_p$ was increased to $404\times10^{-22}$ (i.e., higher than or equal to $200\times10^{-22}$) due to the omission of steps S22 and S23. As a result, the $CH_4$ permeance ratio was increased to 2.6 (i.e., higher than or equal to 1.9) and the leakage of $CH_4$ was increased under high differential pressure conditions. That is, the separation membrane complex had a lower separation ratio.

In Comparative Example 2, steps S22 and S23 were omitted and the large void index $I_p$ was set to be approximately the same ($6.73\times10^{-22}$) as that in Example 1. This increased the thickness of the zeolite membrane 12 and reduced the small void index $I_k$ to $3.60 \times 10^{-15}$ (i.e., lower than $10 \times 10^{-15}$). As a result, the CO, relative permeance was reduced to 0.3. That is, the separation membrane complex had degraded separation capability.

As described above, the separation membrane complex 1 includes the porous support 11 and the separation membrane (zeolite membrane 12 in the above-described example) formed on the support 11. The separation membrane has the small void 121. The small void index $I_k$ expressed by $(\Sigma(S_k^{1.5}))/(S_m^{1.5})$ and indicating the abundance ratio of the small voids 121 is higher than or equal to $10 \times 10^{-15}$, and the large void index $I_p$ expressed by $(\Sigma(S_p^{2}))/(S_m^{2})$ and indicating the abundance ratio of the large voids 121 is lower than $200 \times 10^{-22}$, where $S_m$ is the surface area of the separation membrane, $S_k$ is the area per small void 121, and $S_p$ is the area per large void 122.

By in this way reducing the total area of the large voids 122 in the separation membrane, the separation membrane complex 1 can achieve a high separation ratio. In particular, as can be seen from the $CH_4$ permeance ratio in Examples 1 to 5, the separation membrane complex 1 can achieve a high separation ratio even under high differential pressure conditions. Besides, as can also be seen from the $CO_2$ relative permeance in Examples 1 to 5, the separation membrane complex 1 can achieve high separation capability by maintaining the total area of the small voids 121 in the separation membrane at a certain degree or more.

As described above, the large void index $I_p$ may preferably be lower than $100 \times 10^{-22}$. In this case, as can be seen from the $CH_4$ permeance ratio in Examples 1 to 3 and 5, a higher high separation ratio can be achieved under high differential pressure conditions.

As described above, the small void index $I_k$ may preferably be higher than or equal to $20 \times 10^{-15}$. In this case, as can be seen from the $CO_2$ relative permeance in Examples 1 to 4, the separation membrane complex 1 can achieve higher separation capability.

As described above, when a 25-degree Celsius mixed gas that contains 50% by volume of $CO_2$ and 50% by volume of $CH_4$ is supplied, the $CH_4$ permeance in the case where the supply-side pressure is 8.0 MPaG and the permeation-side pressure is 0.0 MPaG may preferably be lower than 1.9 times of the $CH_4$ permeance in the case where the supply-side pressure is 0.3 MPaG and the permeation-side pressure is 0.0 MPaG. In other words, the $CH_4$ permeance ratio described above may preferably be lower than 1.9. In this case, it is possible to provide the separation membrane complex 1 that suppresses the leakage of $CH_4$ (i.e., low-permeability substance) under high differential pressure conditions.

As described above, the thickness of the separation membrane may preferably be 2.5 times or more and 7.5 times or less the mean pore diameter in the surface layer portion of the support 11 (surface layer 33 in the above-described example). This suppresses an excessive increase or decrease in the thickness of the separation membrane and reduces the total area of the large voids 122 while maintaining the total area of the small voids 121 at a certain degree or more. As a result, it is possible to achieve a favorable separation ratio and favorable permeance to the high-permeability substance, both of which fall within preferable ranges.

Note that the surface layer 33 and an intermediate layer 32 may be omitted from the support 11.

The separation membrane described above may preferably be the zeolite membrane 12. When the separation membrane is composed of zeolite crystals having relatively small pore diameters as described above, it is possible to favorably achieve selective permeation of substances to be permeated that have small molecular diameters and to efficiently separate such substances from a mixture of substances.

More preferably, the zeolite membrane 12 may be composed of a maximum 8- or less-membered ring zeolite. In this case, it is possible to favorably achieve selective permeation of substances to be permeated such as $H_2$ and $CO_2$ that have small molecular diameters and to efficiently separate such substances from a mixture of substances.

The above-described method of producing the separation membrane complex 1 includes the step of preparing the porous support 11 formed by firing (step S21), the step of heating the support 11 at a pretreatment temperature (step S22), the step of washing the support 11 with a fluid after step S22 (step S23), the step of depositing seed crystals on the support 11 after step S23 (step S25), and the step of forming a separation membrane (i.e., zeolite membrane 12) on the support 11 by immersing the support 11 with the seed crystals deposited thereon in a starting material solution and growing a zeolite from the seed crystals by hydrothermal synthesis (step S26). The pretreatment temperature is higher than or equal to 400° C. and lower than 80% of the firing temperature at which the support 11 is fired in step S21. In this case, it is possible to provide the separation membrane complex 1 with a reduced total area of the large voids 122 in the zeolite membrane 12. This separation membrane complex 1 achieves a high separation ratio as described above.

The aforementioned separation method includes the step of preparing the separation membrane complex 1 (step S11), and the step of supplying a mixture of substances that include a plurality of types of gas or liquid to the separation membrane complex 1 and causing a substance with high permeability in the mixture of substances (i.e., high-permeability substance) to pass through the separation membrane complex 1 and to be separated from the other substances (step S12). In this case, it is possible to achieve a high separation ratio in the separation of a mixture of substances as described above.

The separation method is in particular suitable for use in the case where a mixture of substances contains one or more types of substances selected from among hydrogen, helium, nitrogen, oxygen, water, water vapor, carbon monoxide, carbon dioxide, nitrogen oxides, ammonia, sulfur oxides, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

The separation membrane complex 1, the method of producing the separation membrane complex 1, and the separation method described above may be modified in various ways.

For example, the small voids 121 in the zeolite membrane 12 are not limited to voids that are naturally created during the formation of the zeolite membrane 12, and may be created intentionally during the production of the separation membrane complex 1.

The large voids 122 do not necessarily have to be present in the zeolite membrane 12, and the large void index $I_p$ may be zero. The small void index $I_k$ of the zeolite membrane 12 may be lower than $10 \times 10^{-15}$.

The thickness of the zeolite membrane 12 may be less than 2.5 times the mean pore diameter in the surface layer portion of the support 11, or may be greater than 7.5 times this mean pore diameter.

The features of the support 11 such as the materials for a base member 31, the intermediate layer 32, and the surface layer 33, the mean pore diameter, and the average particle diameter of aggregate particles are not limited to those described above, and may be modified in various ways. The support 11 may include a plurality of intermediate layers 32 that have different features such as different mean pore diameters and that are laminated between the base material 31 and the surface layer 33. Alternatively, either the surface layer 33 or the intermediate layer 32 may be omitted from the support 11. As yet alternatively, both of the surface layer 33 and the intermediate layer 32 may be omitted as described above.

The zeolite membrane 12 may be composed of a maximum more than 8-membered ring zeolite. As described above, the zeolite membrane 12 of the separation membrane complex 1 may be composed of any of various types of zeolite.

The $CH_4$ permeance ratio in the separation membrane complex 1 may be higher than or equal to 1.9.

The method of producing the separation membrane complex 1 is not limited to the example described above, and may be modified in various ways.

The separation membrane complex 1 may further include, in addition to the support 11 and the zeolite membrane 12, a functional membrane or a protection membrane that is laminated on the zeolite membrane 12. Such a functional membrane or a protection membrane may be an inorganic membrane such as a zeolite membrane, a silica membrane, or a carbon membrane, or may be an organic membrane such as a polyimide membrane or a silicone membrane.

The separation membrane complex 1 may include, instead of the zeolite membrane 12, a separation membrane that is different from the zeolite membrane 12 (e.g., an inorganic membrane or an organic membrane described above) formed on the support 11.

In the separation device 2 and the separation method described above, substances other than those given by way of example in the above description may be separated from a mixture of substances.

The configurations of the above-described preferred embodiments and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The separation membrane complex according to the present invention is applicable as, for example, a gas separation membrane and is also applicable as a membrane for use in various fields, such as a separation membrane for separating substances other than gas or an adsorption membrane for adsorbing various substances.

REFERENCE SIGNS LIST

1 separation membrane complex
11 support
12 zeolite membrane
33 surface layer
121 small void
122 large void
S11 to S12, S21 to S27 step

The invention claimed is:

1. A separation membrane complex comprising:
a porous support; and
a separation membrane formed on said support,
wherein said separation membrane has a small void,
a small void index $I_k$ expressed by $(\Sigma(S_k^{1.5}))/(S_m^{1.5})$ and indicating an abundance ratio of small voids is higher than or equal to $10 \times 10^{-15}$, and
a large void index $I_p$ expressed by $(\Sigma(S_p^2))/(S_m^2)$ and indicating an abundance ratio of large voids is lower than $200 \times 10^{-22}$,
where $S_m$ is a surface area of said separation membrane, $S_k$ is an area per small void, and $S_p$ is an area per large void.

2. The separation membrane complex according to claim 1, wherein
said large void index $I_p$ is lower than $100 \times 10^{-22}$.

3. The separation membrane complex according to claim 1, wherein
said small void index $I_k$ is higher than or equal to $20 \times 10^{-15}$.

4. The separation membrane complex according to claim 1, wherein
when a 25-degree Celsius mixed gas that contains 50% by volume of $CO_2$ and 50% by volume of $CH_4$ is supplied, $CH_4$ permeance in a case where supply-side pressure is 8.0 MPaG and permeation-side pressure is 0.0 MPaG is lower than 1.9 times of said $CH_4$ permeance in a case where said supply-side pressure is 0.3 MPaG and said permeation-side pressure is 0.0 MPaG.

5. The separation membrane complex according to claim 1, wherein
said separation membrane is a zeolite membrane.

6. The separation membrane complex according to claim 5, wherein
said zeolite membrane is composed of a maximum 8- or less-membered ring zeolite.

7. A method of producing a separation membrane complex, comprising:
a) preparing a porous support formed by firing;
b) heating said support at a pretreatment temperature;
c) after said operation b), washing said support with a fluid;
d) after said operation c), depositing a seed crystal on said support; and
e) forming the separation membrane complex according to claim 1 on said support by immersing said support with said seed crystal deposited thereon in a starting material solution and growing a zeolite from said seed crystal by hydrothermal synthesis,
wherein said pretreatment temperature is higher than or equal to 400° C. and lower than 80 percent of a firing temperature at which said support is fired in said operation a).

8. A separation method comprising;
a) preparing the separation membrane complex according to claim 1; and
b) supplying a mixture of substances that contains a plurality of types of gas or liquid to said separation membrane complex and allowing a substance with high permeability among said mixture of substances to pass through said separation membrane complex and to be separated from the other substances.

9. The separation method according to claim 8, wherein said mixture of substances includes one or more types of substances selected from among hydrogen, helium, nitrogen, oxygen, water, water vapor, carbon monoxide, carbon dioxide, nitrogen oxides, ammonia, sulfur oxides, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

* * * * *